(12) United States Patent
Kuris et al.

(10) Patent No.: US 11,256,608 B2
(45) Date of Patent: Feb. 22, 2022

(54) GENERATING TEST PLANS FOR TESTING COMPUTER PRODUCTS BASED ON PRODUCT USAGE DATA

(71) Applicant: Red Hat, Inc., Raleigh, NC (US)

(72) Inventors: Eran Kuris, Ra'anana (IL); Arie Bregman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/532,861

(22) Filed: Aug. 6, 2019

(65) Prior Publication Data

US 2021/0042214 A1 Feb. 11, 2021

(51) Int. Cl.
*G06F 11/36* (2006.01)
*G06F 16/25* (2019.01)
*H04L 29/08* (2006.01)
*H04L 67/10* (2022.01)

(52) U.S. Cl.
CPC ........ *G06F 11/3684* (2013.01); *G06F 11/368* (2013.01); *G06F 16/258* (2019.01); *H04L 67/10* (2013.01)

(58) Field of Classification Search
CPC .. G06F 11/3684; G06F 11/368; G06F 16/258; H04L 67/10
See application file for complete search history.

(56) References Cited

U.S. PATENT DOCUMENTS

| | | | | |
|---|---|---|---|---|
| 5,892,947 A | * | 4/1999 | DeLong | G06F 11/3676 717/100 |
| 7,174,541 B2 | * | 2/2007 | Muller | G06F 11/36 714/E11.207 |
| 7,490,319 B2 | * | 2/2009 | Blackwell | G06F 11/3664 717/124 |
| 8,001,532 B1 | * | 8/2011 | Jakubiak | G06F 11/3684 717/125 |
| 8,078,924 B2 | | 12/2011 | Jibbe | |
| 8,954,931 B2 | | 2/2015 | Wefers et al. | |
| 9,047,414 B1 | * | 6/2015 | Matyjek | G06F 11/3688 |

(Continued)

FOREIGN PATENT DOCUMENTS

| CN | 109144842 A | 1/2019 |
|---|---|---|
| CN | 109242363 A | 1/2019 |

OTHER PUBLICATIONS

Mattia Fazzini et al. "Automatically Translating Bug Reports into Test Cases for Mobile Apps", Jul. 2018, Association for Computing Machinery (Year: 2018).*

(Continued)

*Primary Examiner* — Douglas M Slachta
(74) *Attorney, Agent, or Firm* — Lowenstein Sandler LLP (57) ABSTRACT

Implementations for generating test plans for testing computer products based on product usage data are described. An example method may include obtaining, by a processing device, data associated with usage of a computer product, identifying, from the obtained data, a first set of parameters relevant to testing the computer product and a first set of values corresponding to the first set of parameters, comparing, by the processing device, the first set of parameters and the first set of values to a second set of parameters and a second set of values associated with a test plan to test the computer product, and generating, by the processing device, a modified version of the test plan in view of the comparison.

20 Claims, 5 Drawing Sheets

(56) References Cited

U.S. PATENT DOCUMENTS

| | | | | |
|---|---|---|---|---|
| 9,317,404 B1* | 4/2016 | Cohen | | G06F 11/368 |
| 9,483,387 B1* | 11/2016 | Allocca | | G06F 11/3684 |
| 9,916,230 B1* | 3/2018 | Huang | | G06F 11/3684 |
| 10,025,698 B2* | 7/2018 | Shah | | G06Q 10/0635 |
| 10,127,134 B2* | 11/2018 | Jayaraman | | G06F 11/3688 |
| 10,901,882 B1* | 1/2021 | Mukhopadhyay | | G06F 11/302 |
| 2003/0196190 A1* | 10/2003 | Ruffolo | | G06F 11/3684 |
| | | | | 717/124 |
| 2006/0136449 A1* | 6/2006 | Parker | | G06F 16/26 |
| 2007/0043980 A1* | 2/2007 | Ohashi | | G06F 11/3684 |
| | | | | 714/45 |
| 2009/0265694 A1* | 10/2009 | Bakowski | | G06F 11/3676 |
| | | | | 717/131 |
| 2010/0287534 A1* | 11/2010 | Vangala | | G06F 11/3612 |
| | | | | 717/124 |
| 2011/0004868 A1* | 1/2011 | Bharadwaj | | G06F 11/3676 |
| | | | | 717/135 |
| 2012/0260132 A1* | 10/2012 | Blue | | G06F 11/3676 |
| | | | | 714/38.1 |
| 2013/0085741 A1* | 4/2013 | Segall | | G06F 11/3684 |
| | | | | 703/21 |
| 2013/0159784 A1* | 6/2013 | Rossi | | G06F 11/3684 |
| | | | | 714/47.1 |
| 2013/0198567 A1* | 8/2013 | Ahmed | | G06F 11/263 |
| | | | | 714/32 |
| 2015/0082287 A1* | 3/2015 | Augustine | | G06F 11/3688 |
| | | | | 717/131 |
| 2015/0169432 A1* | 6/2015 | Sinyagin | | G06F 11/3684 |
| | | | | 717/124 |
| 2015/0286556 A1* | 10/2015 | Ellis | | G06F 11/3692 |
| | | | | 717/125 |
| 2016/0210224 A1* | 7/2016 | Cohen | | G06F 9/44589 |
| 2017/0006135 A1* | 1/2017 | Siebel | | H04L 69/16 |
| 2017/0161180 A1* | 6/2017 | Raghavan | | G06F 11/3684 |
| 2017/0270035 A1* | 9/2017 | Nie | | G06F 11/3684 |
| 2018/0173617 A1* | 6/2018 | Tian | | G06F 9/451 |
| 2019/0213116 A1* | 7/2019 | Kulkarni | | G06F 11/3664 |
| 2019/0243751 A1* | 8/2019 | Ganda | | G06F 11/3664 |
| 2020/0242011 A1* | 7/2020 | Hicks | | G06F 11/3676 |
| 2020/0285569 A1* | 9/2020 | Tung | | G06F 11/3688 |

OTHER PUBLICATIONS

Thilina Ashen Gamage, "Behavior Driven Development (BDD) & Software Testing in Agile Environments", Software Engineer at MillenniumIT (LSEGTechnology), Jul. 2, 2017, 11 pages.

"Optimize Testing and Reduce Software Testing Costs", Digital Transformation & Software Engineering Services, Ness Digital Engineering, Dec. 9, 2015, 6 pages (https://testing-and-reduce-software-testing-costs/).

"Quality Assurance, Quality Control and Testing—the Basics of Software Quality Management", Whitepaper, Altexsoft software r&d engineering, 39 pages.

"Enterprise Quality Assurance and Testing", Ciber Global, LLC, 2019, 1 page (https://www.ciber.com/solutions/enterprise-quality-assurance-and-testing/).

* cited by examiner

GENERATING TEST PLANS FOR TESTING COMPUTER PRODUCTS BASED ON PRODUCT USAGE DATA

TECHNICAL FIELD

The disclosure is generally related to cloud computing systems, and more particularly, to generating test plans for testing computer products based on product usage data.

BACKGROUND

Application lifecycle management (ALM) refers to the product lifecycle management, including governance, development, maintenance, and decommissioning, of a computer product from inception to retirement of the computer product. ALM can include requirements management, product development, quality assurance, change management, release management, etc. As part of the ALM quality assurance efforts, the provider of the computer product generally performs various testing of the computer products in order to continue to deliver accurate and satisfactory functionalities.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein is a system for generating test plans for testing computer products based on product usage data. A quality assurance ("QA") program may involve various processes for testing a computer product to ensure the quality of the computer product. A developer of the computer product may develop the computer product in a particular environment, using a particular set of infrastructure resources, and provide a list of intended ways to execute the product's functionalities. The developer may also perform testing of the computing system in various other environments, using various other infrastructure resources, and using various other ways to execute functionalities. There may still be many other permutations of use of the computer product left untested during development as the product is used by users. Ongoing changes to the computer product, other associated products, and infrastructure resources may also impact the functionalities of the computer product, which in turn necessitates further testing. As a result, an ALM quality assurance effort implements ongoing testing of the computer product throughout the lifecycle of the computer product. The quality assurance efforts can involve identifying customer requirements for a product, identifying use cases, producing a test plan for the product testing using the use cases, executing the test plan, verifying results meet expectations, identifying issues, resolving identified issues, etc.

In some examples, a test plan may identify scope and activities of performing the product testing. A test plan can include a number of test cases. A test case can include instructions to execute an action involving the product. The test case can also include an expected result of executing the action. The test case can include parameters and corresponding values for executing the action. For example, a test case may comprise the following steps: 1) launch computer product A using internet browser B on operating system C; and 2) verify that button D is present. In the example, the action "Launch computer product A" is performed using a parameter "internet browser" and corresponding value "B" and another parameter "operating system" and corresponding value "C." The expected result is "button D is present." In some examples, a test plan can identify various factors including, but not limited to, test items, features to be tested, testing tasks, the resource that performs the test (e.g., a person, a computer system, etc.), test environment, entry and exit criteria for the testing, contingency planning, testing phases, etc. A test plan can include various combinations of parameters and values reflecting different functionalities and features of the product, configuration information, computer environments, infrastructure resources, different types of user interfaces, etc. In various examples, test plans can be maintained using a document, a database, a software application, etc.

Conventionally, test plans are created manually based on assumptions on how users are likely to use the product. For example, a human resource, such as a product manager, may collect information from meetings, customer requests, brainstorming sessions, etc. that are used to produce a list of features frequently used for a product. Sometimes the developer of the product or the testing team can also come up with combinations of features for testing, for example, while developing or testing the product. However, these use cases generally do not include details about the computing and infrastructure environment where the features of the product are tested and used. For some products, the environment where the feature is tested can have significant impact on test results. Since it's not practical to test every single permutation of the technical configurations due to resource constraints (e.g., human resource limitations, computer resource limitations, etc.), the quality assurance team attempts to prioritize parameters that match real life customer scenarios. The goal is to test what the user is using in real life (e.g., in personal space, in an organization, etc.). For example, the product manager may provide to the quality engineer feedback that feature "X" should be tested. However, feature "X" can be used on a single host or multiple hosts. Feature "X" can also be used in combination with feature "Y" and/or feature "Z." Thus, when creating test cases, the quality engineer can select some combinations of the features and technical configurations that are assumed to be more frequently used by users (e.g., customers). However, many important test cases can be missed if the assumptions do not match the real usage by the users. Additionally, users' needs and preferences can change over time, and the information on which the assumptions are made to create the test cases may no longer be fully valid at a later time. The new use scenarios may be left untested if test cases are not updated with the change in usage. However, the conventional approaches do not allow for developing and updating test cases based on real life usage data of the product by the users. Moreover, since there can be a very large number of permutations of the various parameters and their values, the quality assurance team may not be able to perform all different permutations due to resource constraints (e.g., computing resources, human resources, etc.).

Aspects of the disclosure address the above and other deficiencies by providing technology that allows a data driven approach to computer product testing. In implementations of the disclosure, the technology disclosed herein may involve obtaining data associated with usage (e.g., customer specific use of the product such as product configuration data, infrastructure resource data, user interface data, product feature data, etc.) of a computer product. The data can be obtained from various sources that reflect real life user (e.g., customer) data. For example, the data can be obtained from customer contract data for the product, customer support databases, error reporting tools, etc. The data from the various sources can be converted into a unified format of data for further use. The technology may identify a set of parameters relevant to testing the computer product and values corresponding to the set of parameters from the obtained data. In some examples, the technology may limit the values to those that satisfy a threshold criterion (e.g., top 10 types of networks, top 70% of internet browsers, etc.). The technology may then compare the parameters and values obtained from the usage data to parameters and values existing in the test plan. The technology can find differences between the two sets of parameters and values, and generate a modified test plan based on the differences. For example, the technology may add test cases, remove test cases, or change the parameters and values existing in the test case.

Furthermore, implementations of the disclosure can involve technology that builds a test plan using the obtained usage data based on the identified parameters from the usage data and corresponding values. For example, the technology can add one or more test cases to the test plan to test the computing product. In some implementations, the technology can create a set of automation jobs (e.g., instructions to execute a set of actions involving the product without user interaction) to execute the test plan. In some implementations, the technology can generate a test computing environment (e.g., a virtual machine with desired computing resources) according to the parameters and values of the usage data. The technology can provide instructions to execute the test plan, or part of the test plan, using the automation jobs in the test computing environment.

As such, the systems and methods described herein include technology that enhances accuracy, performance and efficiency of computer systems. In particular, aspects of the disclosure provide technology that enhances the efficiency and/or performance of a computing system by generating test plans for testing computer systems and computer products based on real life product usage data so that test plans to test the computer product reflect actual use case scenarios by real users. This may enhance the accuracy and performance of the computer product by reducing errors and issues associated with the computer product that arise from lack of accurate testing of the features and combination of infrastructure configuration that users perform. The technology may also enhance efficiency and performance of computer systems and resources by automatically generating test computing environments for performing all the different permutations of the various test case parameters and their values and automating performance of test cases with all the permutations, and thereby eliminating wasteful manual efforts leading to inaccuracies and inefficiencies associated with the computer resources used to perform the testing.

Figure 1:
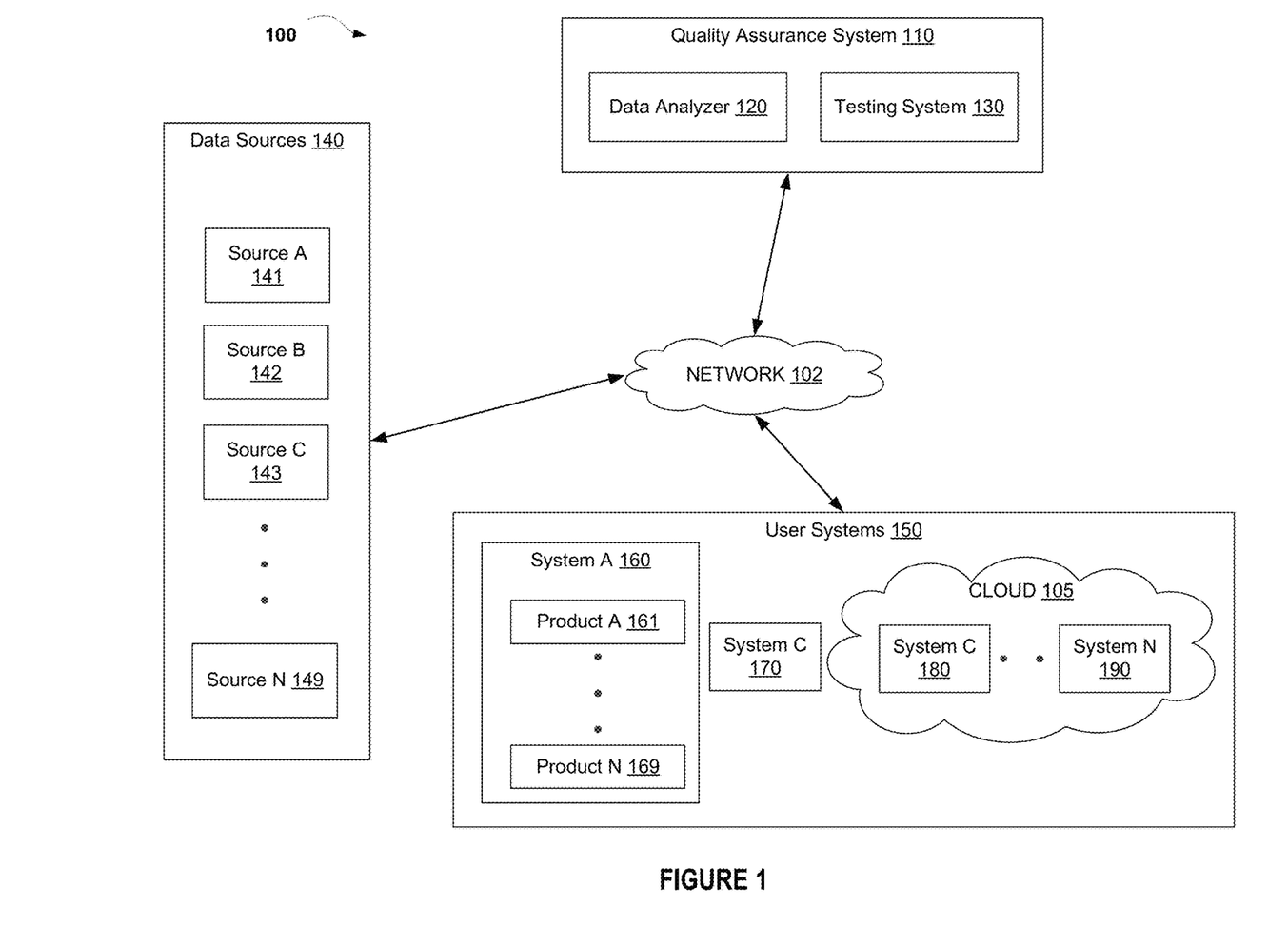
FIG. 1 depicts a high-level block diagram of an example computer system architecture, in accordance with one or more aspects of the disclosure.

FIG. 1 is a block diagram of a network architecture 100 in which implementations of the disclosure may operate. In some implementations, the network architecture 100 may be used to implement a quality assurance system in accordance with implementations of the disclosure. The quality assurance system supports data analysis, test plan generation, automation job creation, and computer environment creation in a distributed system implemented using network architecture 100.

In one implementation, the network architecture 100 includes a quality assurance system 110 communicably coupled via a network 102 to one or more data sources 140 and/or one or more user systems 150. Quality assurance system 110, data sources 140, and/or user systems 150 may include or be hosted within any type of computing devices including a desktop computer, a workstation, a dedicated server, a handheld device or a similar computing device. The network 102 may be may be a private network (e.g., a local area network (LAN), a wide area network (WAN), intranet, or other similar private networks) or a public network (e.g., the Internet). The network 102 can include any number of intermediate computing devices and network elements between the systems 110, 150, and/or data sources 140. The network 102 can include any number or combination of wired and wireless communication mediums between the nodes in the network.

In one implementation, user systems 150 may include systems 160 through system 190. Systems 160-190 can provide computing functionality to execute applications, and/or processes associated with the applications. In some examples, systems 160-190 may include, but are not limited to, application servers, database servers, content servers, load balancers, monitoring systems, alert systems, and so on. Each of the user systems 150 (e.g., systems 160-190) may include one or more computer products. The products may include, but are not limited to, desktop program, web application, enterprise applications, gaming system, mobile application, backend systems, system monitoring tools, device drivers, firmware, hardware tools, etc. The products may provide various computing functionalities. Products 161-169 may include different products, different instances of the same product, or a combination thereof. Each of the systems 160-190 may include different products, different instances of the same product, or a combination thereof. Each product may provide one or more features and/or functionalities. Each product may be supported by and/or compatible with one or more infrastructure resources (e.g., processor, memory, network, etc.) and/or one or more user interfaces. In one example, system A 160 includes product A 161 through product N 169. The In one implementation, each system 160-190 may be hosted on any type of computing device, such as a server computer system, a desktop computer or any other computing device. In one implementation, one or more of the systems 160-190 may be hosted in a cloud-computing environment 105 (also referred to herein as a cloud). For example, cloud 105 may include systems 180, 190. In some implementations, a system 160-190 is implemented as a virtual machine (VM) that is hosted on a physical machine (e.g., host machine) implemented as part of the cloud 105. In some implementations, a system 160-190 is implemented as a container that is hosted on a physical machine implemented as part of the cloud 105. When systems 160-190 are implemented as VMs or containers, the systems 160-190 may be executed by operating systems (OSs) on host computing machines. In some implementations, the systems 160-190 are located in a data center.

User systems 150 may represent systems and include products used and implemented by various users (e.g., individuals, organizations, etc.). In some examples, computer products included in the user systems 150 may be provided by one or more product owners (e.g., developers) for use by the users. For example, a product owner may be one of the entities that implements the quality assurance system 110. The product owner may provide (e.g., sell, lease, license, etc.) the product to the users as customers. The product owner may provide initial and ongoing customer support to the users of their products. For example, the product owner may initially set up a product for the customer with an initial set of configuration parameters. The product owner may provide technical maintenance support to the customer when the product is in use. The product owner may assist in resolving technical issues for the customers. The customers may also change configurations and resolve issues on their own.

In one implementation, data sources 140 may include various data sources that are used to collect and track different types of data in relation to user systems 150, and products included in one or more of the user systems 150. For example, data sources 140 may include source A 141 through source N 149. One or more servers may host one or more of the sources 141-149. Sources 141-149 may include data stores, databases, database servers, database applications, information storage tools, reporting tools, etc. Sources 141-149 may include actual data obtained from the computer product and servers hosting the computer product.

In one example, source A 141 may represent data involving customer contracts. For example, product owner may have a contract with a customer to provide a particular computer product, or service related to the product. In some examples, one customer may have multiple accounts and/or multiple contracts per account. The contract can list various configuration parameters and values. Generally contracts can provide data for initial configuration of customer's usage of the product. In some cases, contracts can be renewed and identify changes in the customer's requirements and usage of the product. Data source A 141 may include customer requirements and topologies (e.g., properties, relationships, etc.). As examples, the contract can identify information including, but not limited to, enabled features, special features, number of nodes, sizes of nodes, number of user accounts, etc. In some examples, contracts provide data that provide insights into the hypothetical usage of the product for the customer. In some examples, source A 141 may include the contract itself (e.g., a document). Data can be scanned or read from the contract and inserted into a data store. In some example, source A 141 may include data (e.g., parameters and values) obtained from the contract.

In one example, source B 142 may represent customer support related data. For example, as part of customer support activity, the product owner may receive data from the customer when customer has an issue that needs to be resolved. The data can involve various parameters and values that are necessary to resolve the issue. The data can include, but is not limited to, details of infrastructure settings, configuration files, environmental details, example of actual data (e.g., content) used within the product, etc. In some examples, source B 142 may include a list of customer support cases. In some examples, source B 142 may include a report containing the data. In some examples, source B 142 may include the data extracted from a customer incidents report. In some examples, customer support data provides insights into the actual usage of the product for the customer.

In one example, source C 143 may represent data collected from other types of customer reporting tools. For example, a tool may be used to report back information relevant to a product to the product owner when the user runs into an issue with the product. In some instances, the report may be sent without requesting the product owner to resolve the issue immediately. The report may include various parameters and values the user was using at the time the issue occurred. The user may be given an option to send data to the product owner or not. In some examples, source C 143 may include the report containing the data. For example, the data may include user input, trend, feature usage, etc. In some examples, source C 143 may include the data extracted from the report. In other examples, various other data sources may include different types of data associated with customer usage of the computer product and the data can be collected using different mechanisms. In some examples, customer reporting tools provide insights into the actual usage of the product for the customer.

In one implementation, network architecture 100 includes a quality assurance system 110 that implements testing of computer products. For example, quality assurance system 110 implements testing of computer products deployed in user systems 150 based on product usage data obtained from data sources 140. As such, the quality assurance system 110 can handle data analysis, test plan generation, automation job creation, and computer environment creation for testing computer products (e.g., products 161-169) of systems 160-190 of the network architecture 100. The quality assurance system 110 may reside on one or more machines (e.g., server computers, desktop computers, etc.).

In one implementation, the quality assurance system 110 includes a data analyzer 120 and a testing system 130. Although the data analyzer 120 and the testing system 130 are illustrated as residing under a single system, these components may be distributed across multiple separate systems and/or machines implementing the functionality of the quality assurance system 110.

In one implementation, data analyzer 120 obtains data associated with usage of a computer product. For example, the data can be obtained from various sources, such as data sources 140, reflecting actual user data associated with computer products, such as products 161-169, in user systems 150. The data from the data sources can be inserted into a data store internal or external to the data analyzer 120. The data from the sources 140 may be converted into a unified format of data for further use. Data analyzer 120 may be configured to identify a set of parameters relevant to testing the computer product. For example, a user interface associated with quality assurance tool 110 may display multiple items (e.g., node types, number of nodes, etc.) from the obtained data and a user selection of one or more items (e.g., node types) may be received from the user interface. Data analyzer 120 may identify a first set of parameters (e.g., types of nodes) from the obtained data corresponding to the one or more received items. Data analyzer 120 may identify values (e.g., database nodes, application nodes, content nodes, load balancer nodes, etc.) corresponding to the set of parameters from the obtained data. In some examples, data analyzer 120 may limit the values to those that satisfy a threshold criterion (e.g., top 3 types of nodes) which can filter out some of the data to provide most frequent data items.

Data analyzer 120 may then compare the parameters and values obtained from the usage data to parameters and values in an existing test plan designed to test one or more of the computer products (e.g., products 161-169). Data analyzer 120 may find differences between the two sets of parameters and values to generate a modified test plan based on the differences. For example, data analyzer 120 may find that values of the parameters from the obtained data do not match with the values of the corresponding parameters of the test plan. In another example, data analyzer 120 may find that parameters of the test plan differ from the parameters in the obtained data, such as, additional or fewer parameters exist in the test existing test plan. Data analyzer 120 may communicate the analysis of the data to other parts of the quality assurance system 110.

In one implementation, the quality assurance system 110 includes testing system 130. Testing system 130 may include functionalities to generate or regenerate test plans, automate execution of the testing, generate computer environments to match the parameters from the obtained usage data, etc. In some example, testing system 130 can generate a modified test plan based on the difference identified by data analyzer 120. In some example, testing system 130 can build a new test plan using the obtained usage data based on the identified parameters from the usage data and corresponding values. For example, testing system 130 can add one or more test cases to the test plan to test the computing product(s). In some implementations, testing system 130 can create a set of automation jobs to execute the test plan without any user (e.g., human tester) interaction. In some implementations, testing system 130 can generate a test computing environment, such as a virtual machine or a container, according to the parameters and values of the obtained usage data. In some implementations, testing system 130 can provide instructions to execute the test plan, or part of the test plan, using the automation jobs in the test computing environment. In some example, the instructions can be provided internally to a tool within the testing system to execute the test plan. In some example, the instructions can be provided to another system (e.g., another server) to execute the actions identified in the test plan.

Additionally, network architecture 100 can include any type and number of storage devices (not shown). The storage devices can be fixed disk drives, removable storage medium drives that are external or internal drives, random access memory (RAM), static memory or similar storage devices.

Figure 2:
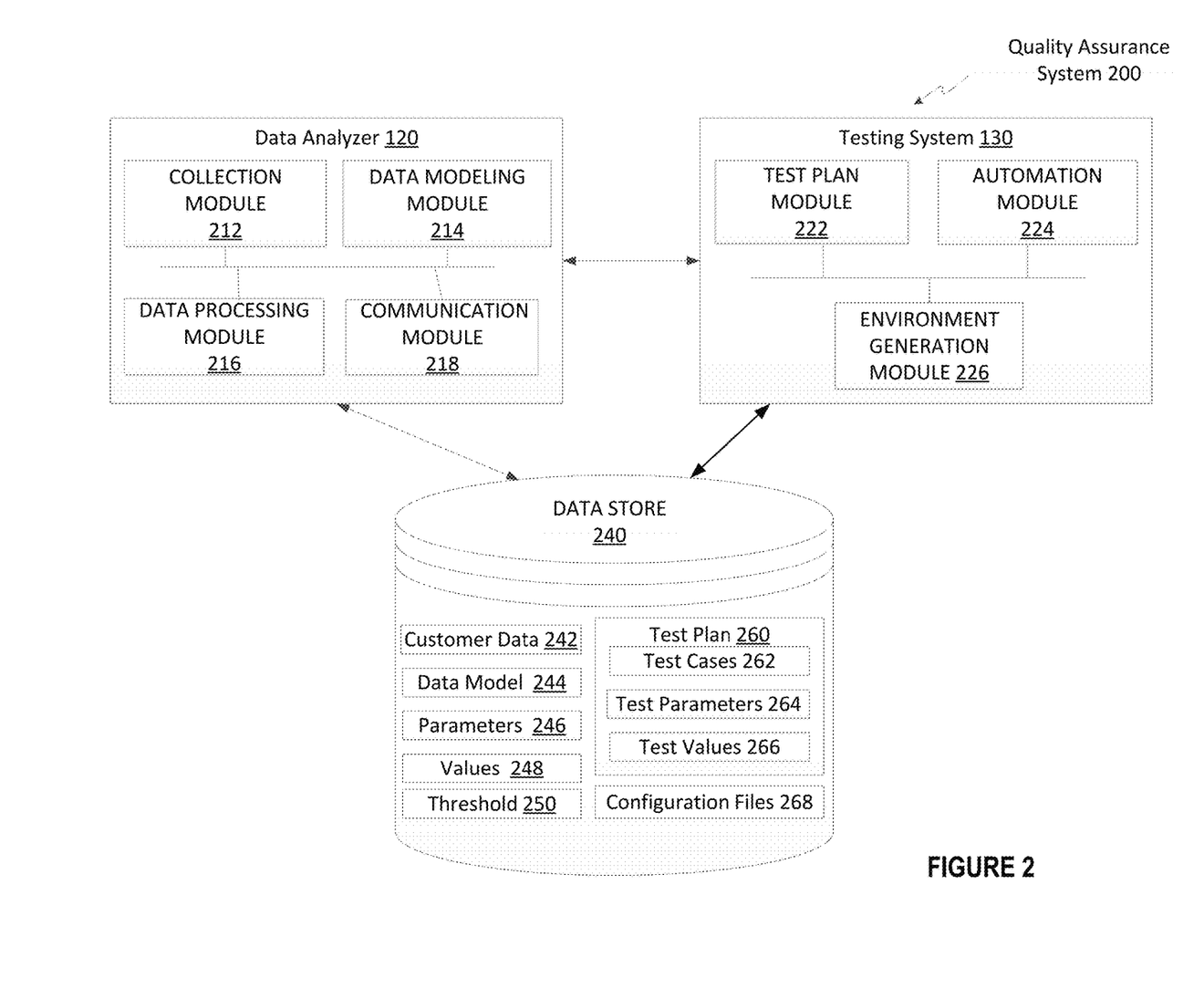
FIG. 2 depicts an example quality assurance system for generating test plans for testing computer products based on product usage data, according to one or more aspects of the disclosure.

FIG. 2 depicts a block diagram illustrating an example quality assurance system 200 for generating test plans for testing computer products based on product usage data, according to one or more aspects of the disclosure. In one embodiment, the quality assurance system 200 can be the same as the quality assurance system 110 of FIG. 1. Quality assurance system 200 includes a data analyzer 120, a testing system 130, and a data store 240. Note that in alternative embodiments, the quality assurance system 200 may include more or less modules than those shown in FIG. 2. Also, the data analyzer 120 and testing system 130 may be combined into a single module. Additionally, the functionality of any of the data analyzer 120 and the testing system 130 may be divided between multiple modules and sub modules. Data store 240 may include various data, including but not limited to, customer data 242, data model 244, parameters 246, values 248, threshold 250, test plan 260, test cases 262, test parameters 264, test values 266, configuration files 268, etc. Data store 240 may be divided into multiple data stores that each store different types of data described herein.

In one implementation, data analyzer 120 may obtain, analyze, and process data associated with usage of a computer product. In one example, data analyzer 120 may include a collection module 212, a data modelling module 214, a data processing module 216, and a communication module 218. In other implementations, data analyzer 120 may include additional or fewer modules, and functionalities of the modules may be combined or divided amongst the various modules.

In one implementation, collection module 212 obtains data associated with usage of the computer product (e.g., product A 161). In an example, the data can be obtained from various sources (e.g., contract data source, customer support data source, error reporting tool data source, etc.) which reflect usage data associated with various computer products (e.g., products 161-169). The various data sources include customer specific use of the product owner's product. For example, the various data sources can contain one or more types of records that include, but are not limited to, product configuration data, infrastructure resource data, user interface data, product feature data, etc. The records can include, for example, the computing environment setup in which the product operates, infrastructure resources (e.g., storage type, network type, number of nodes in the cloud used, etc.), network information (e.g., content of configuration files, network setup, type of switches used, etc.), web application usage trend, such as, number of clicks on different parts of the web applications (e.g., logo, buttons, links, etc.), and so on. The records can exist in the data sources in various formats. For example, the records can include data in a databases, freeform text in a document that can be extracted from the document, XML data, etc. In an example, the different types of records can be collected by the collection module 212. The records from the data sources can be inserted into a data store that is internal or external to the collection module 212. In an example, collection module 212 can insert the records, as represented by customer data 242, into data store 240.

In one implementation, data modelling module 214 may convert the different types of records into a unified format of data for further use. For example, customer data 242 can be converted into a unified format to produce a data model 244 representing the usage data for the computer product. Data model 244 can reside in data store 240. In some implementations, data modelling module 214 may generate data model 244 using various data modeling methods, such as, decision trees, machine learning (e.g., supervised, unsupervised), entity relationship model, data mapping, hierarchical structures, etc.

In an example, quality assurance system 200 can obtain, insert, and/or convert the records automatically without any user interactions. For example, an automated job can be setup for collecting, inserting, and/or converting the records on a predetermined schedule, on a routine basis, or the collection, insertion, and/or conversion can be triggered by a particular action (e.g., a change in size of database, identifying a new data source, etc.) detected by the quality assurance system.

In one implementation, data processing module 216 may process the unified data to analyze the data for testing purposes. In some examples, the quality assurance team may desire to limit the data to certain categories to prevent the quality assurance system 110 from possibly crashing in attempt to process the significant volume of data that may be obtained from the various sources. Data processing module 216 may allow to filter the data based on various factors that are relevant for the quality assurance testing. In an example, data processing module 216 may be configured to identify a set of parameters relevant to testing the computer product. For example, a user interface associated with quality assurance tool 110 may display multiple items (e.g., node types, number of nodes, etc.) based on the obtained data, such as, the data model 244. The quality assurance ("QA") team may be interested to focus the testing to a particular area or combination of areas. A user (e.g., a QA team member) can provide a user selection of one or more items (e.g., number of nodes) from the displayed items on the user interface. Data processing module 216 may receive the user selection and identify a set of parameters (e.g., number of nodes) from the data model corresponding to the received user selected item (e.g., number of nodes). In some examples, the data processing module 216 can identify the set of parameters automatically. For example, the data processing module 216 can identify the parameters from the data model without any user interactions. The parameters can be identified automatically based on a mapping between the parameters in the data model and the user selected items. In an example, the selected parameters can be stored in data store 240 as parameters 246.

Data processing module 216 may identify values (e.g., "20 controller nodes," "5 controller nodes," etc.) corresponding to the set of parameters (e.g., number of nodes) from the obtained data (e.g., data model 244). In some example, the QA team may desire to focus on values satisfying certain criteria. Data processing module 216 can allow the user (e.g., QA team members) to indicate a threshold criteria by which to filter the values corresponding the selected parameter. For example, the QA team may decide to focus on the top 2 most popular combination of "number of nodes" that are used by the users. The data may indicate that a group of 30 customers are using "20 controller node," a group of 10 customers are using a "5 controller node," a group of 8 customers are using a "10 controller node," and so on. If the threshold criterion is set as top 2 most popular "number of nodes," then the data processing module can limit the values to "20 controller node" (30 customers) and "5 controller node" (10 customers) to identify the top 2 popular values. In an example, the filtered values can be stored in data store 240 as values 248.

The threshold criterion for each parameter may be same or different. In some example, the criterion is configurable, so that it can be changed as necessary, for example, based on the number of testing resources (e.g., QA team members, computing resources, automation servers, etc.). For example, the QA team may want to expand the values to top 5 most popular "number of nodes" and change the threshold criterion accordingly to retrieve the corresponding values. In an example, the threshold criterion can be stored in data store 240 as threshold 250. Data processing module 216 may accept multiple threshold criteria (e.g., combination of different criterion). In some example, the threshold criteria can include a threshold value, such as a percentage value, a fixed number, etc. Depending on how it is defined in the quality assurance system, satisfying the threshold criteria can mean that the value from the obtained data is equal to, above, or below the threshold value. In an example, data processing module 216 can identify the set of values satisfying the threshold criterion automatically without any user interaction. For example, the data processing module 216 can compare the values in the data model to the threshold value to identify if the threshold criterion is satisfied, without user interaction.

Data processing module 216 may compare the parameters and values obtained from the usage data to parameters and values in an existing test plan designed to test the computer product. For example, the test plan may include multiple test cases. In an example, data store 240 may include test plan 260 and test cases 262. Each test case may, at the minimum, include a set of actions (e.g., steps) to perform involving the product. The test plan may indicate that the set of actions are to be performed using a set of parameters (identified as "test parameters 264" in data store 240) and corresponding values (identified as "test values 266" in data store 240) listed in the test plan. Data processing module 216 can compare the set of parameters and values (e.g., test parameters 264 and values 266) associated with the test plan to the set of parameters and values (e.g., parameters 246 and values 248) obtained from the data model 244. Data processing module 216 may find differences between the two sets of parameters and values. For example, data processing module 216 may find difference between values 266 and values 248, indicating that values corresponding to parameters from the customer usage data do not match with the values of the corresponding parameters of the existing test plan. For example, test plan 260 may include test cases 262 with test parameter 264 "network type" that has values 266 indicating "network type A," while majority of users use "network type B" as indicated by parameters 246 "network type" and corresponding values "network type B" obtained from the data model 244. The difference between the values can be used to modify the values of the test cases such that the test plan reflects the actual customer usage. In another example, data processing module 216 may find that test parameters 264 differs from parameters 246 from the data model 244, such as, additional or fewer parameters exist in the test existing test plan 260. For example, test parameters 264 may not include parameters for "storage type" while data model 244 includes parameters "storage type" indicating different values. The difference between the parameters can be used to modify the test plan to include additional test cases reflecting the customer usage. In Communication module 218 may communicate the results of the analysis from the data processing module 216 to other parts of the quality assurance system 110. For example, the differences between the sets of parameters and values identified by data processing module 216 can be communicated by communication module 218 to the testing system 130, and/or various modules of the testing system 130. In one example, the analysis can be communicated to testing system 130 to add, remove, or update test cases 262 to the test plan 260. In another example, the difference (e.g., additional parameters and values) can be transmitted to testing system 130 for adding additional automation jobs reflecting the parameters and values to automate the testing. In another example, the difference (e.g., difference in values of parameters) can be transmitted to testing system 130 for creation of computing environments in which the updated test cases can be performed.

In one implementation, testing system 130 may generate test plans, automate execution of the testing using the test plans, and generate computer environments to perform the testing, etc. for testing the computer product. In one example, testing system 130 may include a test plan module 222, an automation module 224, and an environment generation module 226. In other implementations, testing system 130 may include additional or fewer modules, and functionalities of the modules may be combined or divided amongst the various modules.

In some example, test plan module 222 can generate a modified version of the test plan based on the difference identified by data analyzer 120. In some examples, the test plan module 222 may use test case templates to generate the modified version of the test plan. The modified version of the test plan may include test cases with set of actions that are to be performed using parameters and values obtained from the data model. For example, based on the difference, test plan module 222 can add a set of test cases to the test plan 260 to include parameter "storage type" and corresponding values from the data model 244, as test parameters 264 did not include this parameter. In another example, test plan module may remove an existing set of test cases from the test plan where the test parameters 264 include additional parameters than what is identified in parameters 246, or where test values 266 include additional values than what is identified by values 248 obtained from the customer usage data, since customers are not using the parameter and/or the values. In another example, test module 222 may update an existing set of test cases 262 that include test parameter "network type," where values "network type A" is changed to values "network type B" based on the usage data (e.g., data model 244).

In an example, test plan module can receive the difference between the two sets of parameters and values, and automatically update the test plan (e. g., generate a modified version of the test plan). For example, test plan module can automatically add, remove and/or update the test cases without any user interactions. The process of updating the test plan can be seamless and transparent to a user and be performed in the background by the test plan module.

In another example, the test plan module can provide a notification and/or the difference to a user in a user interface of the quality assurance system 200. The user may be given an option to modify the test plan altogether, or select the test cases to modify. The user can have an option to accept the modification, in which case the test plan module 222 can generate the modified version of the test plan. The user can also have the option to decline the automatic modification, in which case the test plan module 222 does not generate the modified version of the test plan. The test plan module may provide the difference to the user for manual modification of the test plan. In one example, an interface can be provided for the user to make the changes in the test plan. In an example, test plan module 222 can provide one or more configuration files including the parameters 246 and values 248, or the difference in the parameters and values to the test parameters and values, as an attachment with the modified version of the test plan. The configuration file can be used to change the parameters on the computer product or supporting infrastructure during manual or automated performance of the testing using the test plan. In an example, configuration files 268 may be stored in data store 240.

In some example, test plan module 222 can build a new test plan using the obtained usage data based on the identified parameters and values from the data model. For example, test plan module 222 can add a set of test cases to the test plan to test the computing product. The set of test cases may include actions involving the product that are to be performed using the parameters 246 and values 248. In some example, a user of the quality assurance system 200 may accept the addition of the test cases by the test plan module 222 using a user interface. In some example, the test plan module 222 can automatically add the set of test cases to build a new test plan without any user interactions.

In some example, modules or sub-modules of the quality assurance system 200 described herein may be part of different servers or systems. For example, the test plan 260 may reside in a system that is external to the quality assurance system 200, or the test plan module 222. In such case, a driver can be provided created to deliver the modification or addition of test plan to the external system. A driver is a software program that can be created to access functions of a tool without needing to know precise details of the tool. A driver can act as a translation tool between the test plan module 222 and the external system comprising the test plan, so that the modification or addition of the test cases can be accepted by the external system and data can be read and written to and from the external system. Testing system 130 may provide instructions to update a test plan (e.g., add, remove, update test cases) or create a new test plan (e.g., add new test cases) to the external system that manages the test plans.

In some implementations, automation module 224 can create a set of automation jobs to execute the test plan without any user (e.g., human tester) interaction. In some example, the set of automation jobs can include a set of instructions to execute a set of actions without user interaction. The set of actions are used to automate testing steps identified in the test plan. The automation module 223 can receive parameters and values from the test plan module (e.g., parameters 264 and values 266) which can reflect the modified or newly generated test plan, or from the data analyzer (e.g., parameters 246 and values 248) that can reflect the customer usage data form the data model 244. In some examples, the automation jobs can be created from automation templates, with fields for parameters and values. The parameters and values of the template can be populated by the received parameters and values. In some examples, the automation module 224 can create a copy of an existing job and change the parameters and values to the received parameters and values to create automation jobs.

In some implementations, environment generation module 226 can generate a test computing environment according to the parameters and values received from the test plan module 222 or the data model 244 from the data analyzer 120. For example, a test computing environment can be generated by instantiating a virtual machine (VM), a container, etc. A test computing environment can be a temporary computing environment that is set up using one or more values corresponding to one or more parameters. For example, a VM can be generated and instantiated with infrastructure resources (e.g., a particular amount of storage, a type of network connection, etc.) according to the received parameters and values. The test computing environment can be terminated after performing the set of test cases that use the parameters and values used in the test computing environment. In one example, an automation job can be ran in the test computing environment to perform steps of the test cases. In another example, a human tester can perform the steps or actions identified in the test cases using the test computing environment.

In some examples, testing system 130 can include servers that can host the test computing environments. For example, a VM can be hosted on the same server that hosts the testing system 130. In other examples, test computing environments may be set up in a server external to the environment generation module 226. In such a case, environment generation module 226 can provide parameters and values to the external server to generate the test computing environment. In other examples, environment generation module 226 may reside on a server external to the testing system 130, or quality assurance system 200. In such a case, a module of the testing system 130 (such as, test plan module 222) or another module (such as communication module 218) can provide parameters and values to the external server to generate the test computing environment.

In some implementations, testing system 130 (or a module of the testing system 130) can provide instructions to execute the test plan, or part of the test plan in the test computing environment. In some example, the testing can be performed using the automation jobs. In some example, the instructions can be provided internally to a tool within the testing system 130 to execute the test plan. In some example, the instructions can be provided to another system (e.g., another server) to execute the actions identified in the test plan. In some example, the instructions can be provided to a user via a user interface, where the user can accept to perform the steps of the test cases manually or using an automation tool in the test computing environment. In some example, a tool can capture the results (e.g., passed, failed, in progress, not started, etc.) of performing the test cases and record the results in data store 240.

Figure 3:
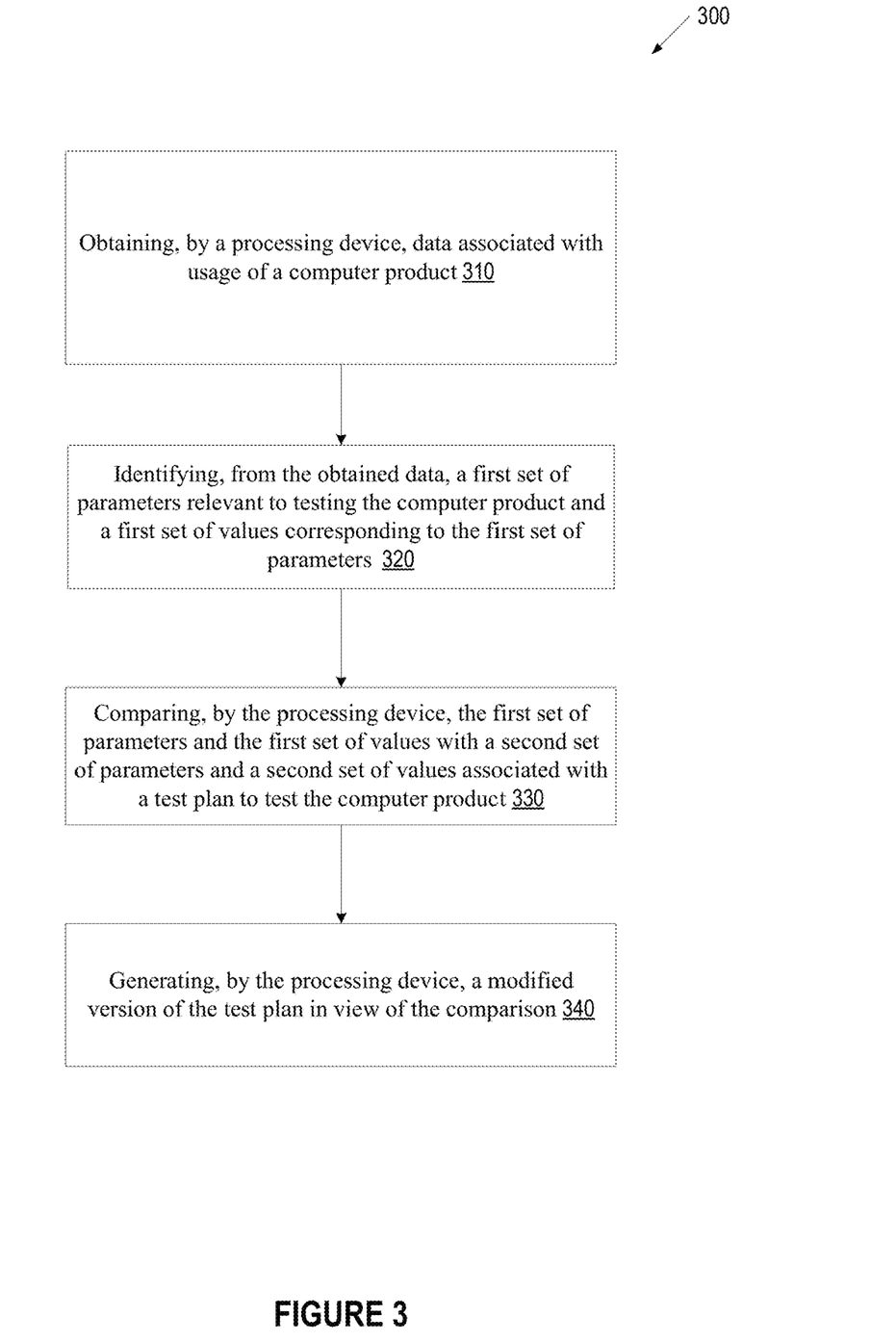
FIG. 3 depicts a flow diagram of an example method for generating a modified version of a test plan, in accordance with one or more aspects of the disclosure.
Figure 4:
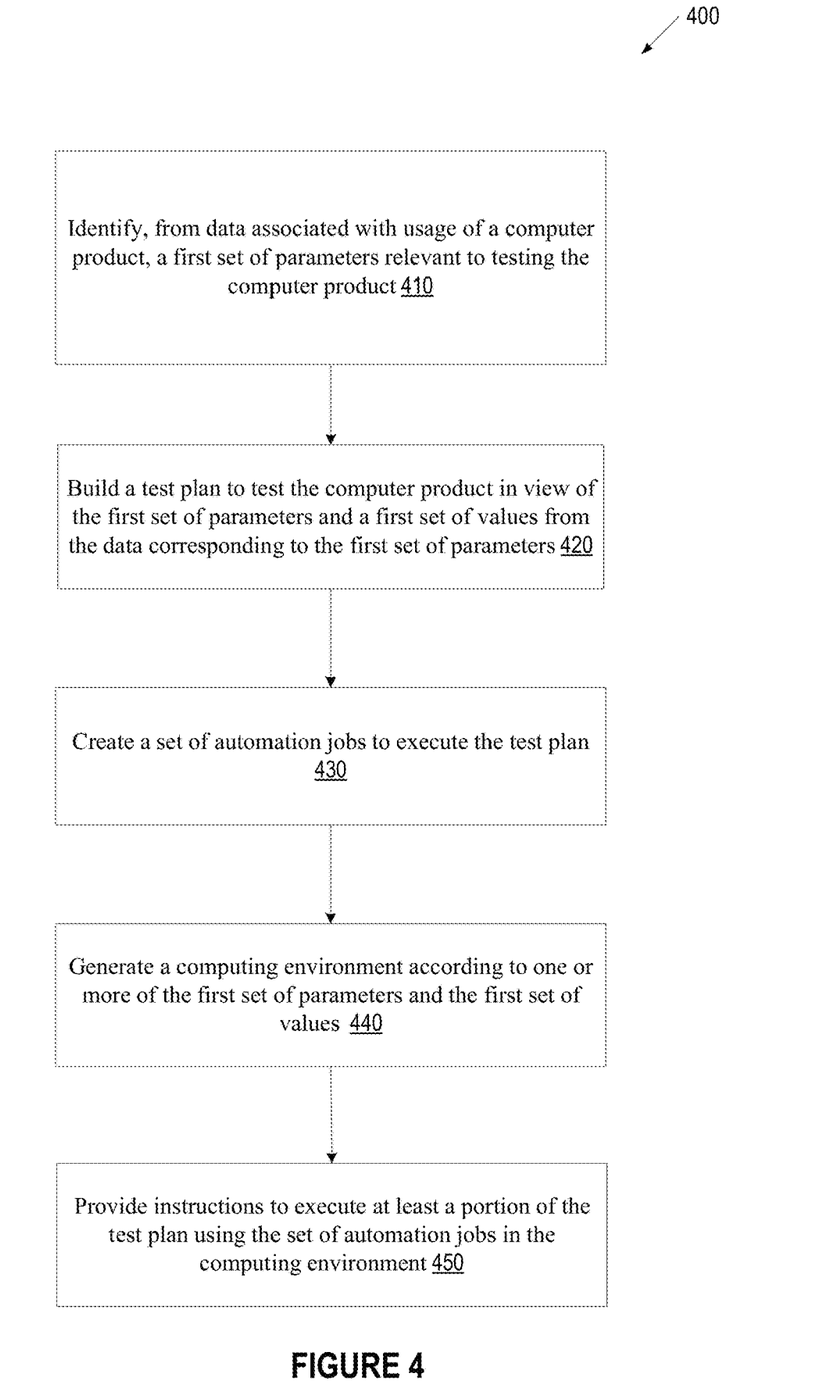
FIG. 4 depicts a flow diagram of an example method for executing a test plan using a set of automation jobs, in accordance with one or more aspects of the disclosure.

FIGS. 3 and 4 depict flow diagrams for illustrative examples of methods 300 and 400 for for generating test plans for testing computer products based on product usage data, in accordance with one or more aspects of the disclosure. Method 300 illustrates an example process flow for generating a modified version of a test plan, according to at least one implementation. Method 400 is an example process flow for executing a test plan using a set of automation jobs, according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by quality assurance system 110 as shown in FIG. 1.

Referring to FIG. 3, method 300 may be performed by processing devices of a server device or a client device and may begin at block 310. At block 310, a processing device may obtain data associated with usage of a computer product. In some example, data associated with usage of the computer product may include data reflecting customer specific use of the product. For example, the data can include one or more of product configuration data, infrastructure resource data, user interface data, or product feature data. In some examples, the data is obtained by obtaining one or more types of records from one or more data sources, inserting the one or more types of records into a data store, and converting the one or more types of records to a unified format of records to produce the data.

At block 320, the processing device may identify, from the obtained data, a first set of parameters relevant to testing the computer product and a first set of values corresponding to the first set of parameters. In some examples, to identify the first set of parameters, the processing device may receive a user selection of one or more items from a user interface. The one or more items may be associated with the obtained data. The processing device may identify the first set of parameters from the obtained data corresponding to the one or more items. In some examples, to identify the first set of values, the processing device may identify values from the obtained data satisfying a threshold criterion for each parameter of the first set of parameters. In an example, the threshold criterion for each parameter of the first set of parameters is configurable.

At block 330, the processing device may compare the first set of parameters and the first set of values to a second set of parameters and a second set of values associated with a test plan to test the computer product. In some examples, the test plan may comprise one or more test cases. Each of the one or more test cases may comprise a set of actions to be performed that involves the computer product. In some example, the set of actions are performed using one or more of the first set of parameters and the first set of values, or the second set of parameters and the second set of values.

At block 340, the processing device may generate a modified version of the test plan based on the comparison. In some examples, the processing device may modify the test plan by adding a first set of test cases to the test plan, removing a second set of test cases from the test plan; or update of a third set of test cases in the test plan. Additionally, in some examples, the processing device may provide one or more configuration files with the modified version of test plan to test the computer product using the one or more configuration files. Moreover, in some examples, the processing device may provide a computing environment according to one or more of the first set of parameters and the first set of values to test the computer product using the modified version of the test plan. Furthermore, in some examples, the processing device may create a set of automation jobs to execute the modified version of the test plan. In an example, the set of automation jobs may include a set of instructions to execute a set of actions without user interaction, where the set of actions are used to automate testing steps identified in the test plan.

Referring to FIG. 4, method 400 may be performed by processing devices of a server device or a client device and may begin at block 410. At block 410, a processing device may identify a first set of parameters relevant to testing a computer product from data associated with usage of the computer product. In some examples, to identify the first set of parameters, the processing device may receive a user selection of one or more items from a user interface, where the one or more items are associated with the data. The processing device may identify the first set of parameters from the data corresponding to the one or more items.

At block 420, the processing device may build a test plan to test the computer product in view of the first set of parameters and a first set of values from the data corresponding to the first set of parameters. In some example, a test plan may be built by adding one or more test cases to the test plan. Each of the one or more test cases may include a set of actions to be executed involving the computer product.

At block 430, the processing device may create a set of automation jobs to execute the test plan. In an example, the set of automation jobs can include a set of instructions to execute a set of actions without user interaction. The set of actions can be used to automate testing steps identified in the test plan.

At block 440, the processing device may generate a computing environment according to one or more of the first set of parameters and the first set of values. For example, a test computing environment can be generated by instantiating a virtual machine (VM), a container, etc. At block 450, the processing device may provide instructions to execute at least a portion of the test plan using the set of automation jobs in the computing environment. In some examples, the instructions can be provided to another system (e.g., another server) separate from the processing device to execute the actions identified in the test plan.

Figure 5:
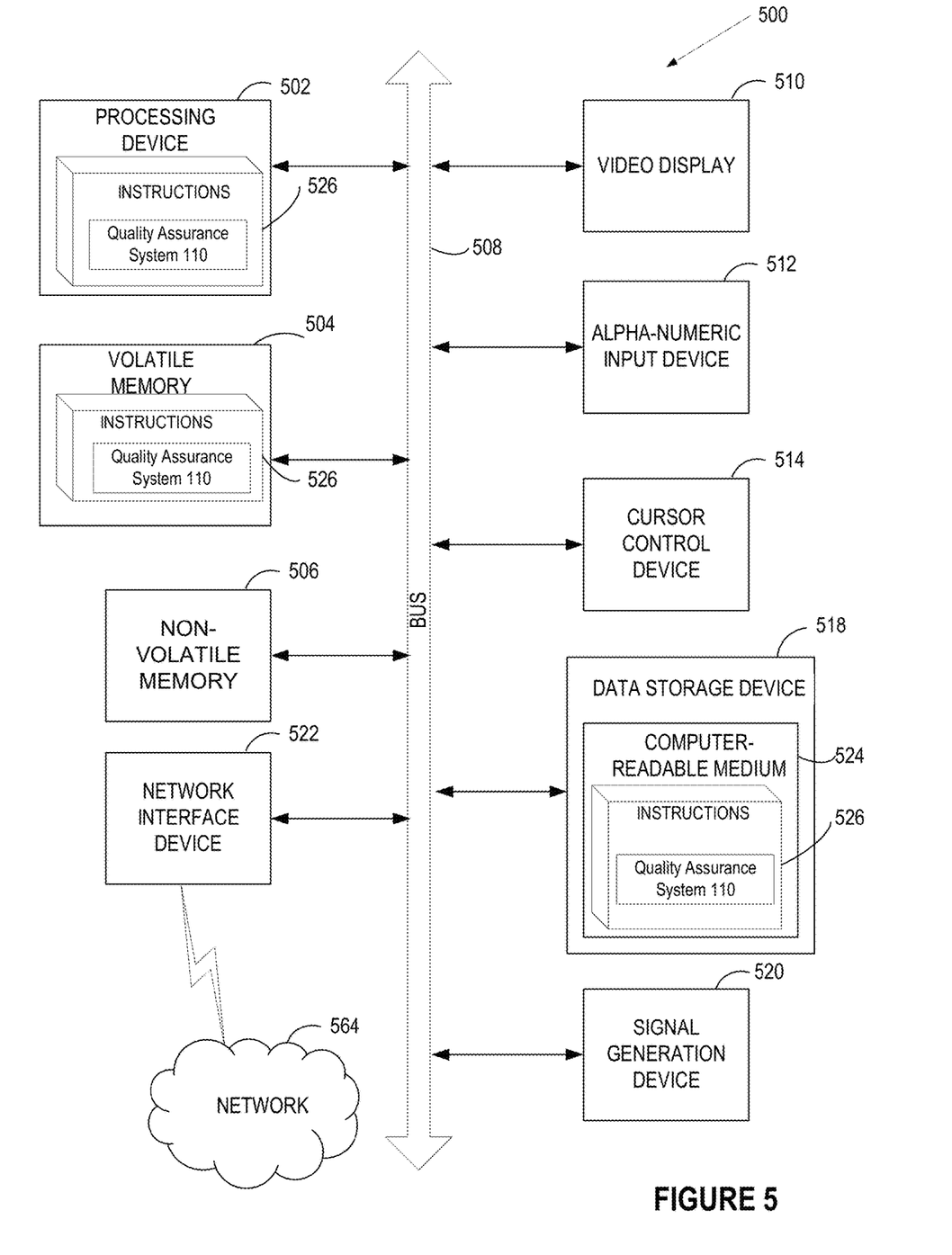
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to network architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 400 for quality assurance system 110 (which may be the same as quality assurance system 110 of FIG. 1) and the modules illustrated in FIGS. 1 and 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
  obtaining, by a processing device associated with a quality assurance system, a plurality of data records associated with customer specific usage of a computer product external to the quality assurance system, wherein the plurality of data records comprises a first data record having a first data format and a second data record having a second data format different from the first data format;
  converting, by the processing device, the plurality of data records into a set of data having a unified data format representing the customer specific usage of the computer product;
  receiving, by the processing device, a request to filter the set of data in view of an item;
  in response to receiving the request, obtaining, by the processing device from the set of data, a set of relevant data relevant to testing the computer product by identifying a first set of parameters relevant to testing the computer product based on a mapping between parameters of the set of data and the item, and a first set of values corresponding to the first set of parameters;
  comparing, by the processing device, the first set of parameters and the first set of values to a second set of parameters and a second set of values associated with a test plan to test the computer product, thereby identifying a set of differences; and
  generating, by the processing device, a modified version of the test plan by modifying the second set of parameters and the second set of values based on the set of differences.

2. The method of claim 1, wherein the test plan comprises one or more test cases, each of the one or more test cases comprising a set of actions to be performed involving the computer product.

3. The method of claim 2, wherein the set of actions comprises an action performed using one or more of: the first set of parameters and the first set of values, or the second set of parameters and the second set of values.

4. The method of claim 1, wherein the data associated with customer specific usage of the computer product comprises one or more of product configuration data, infrastructure resource data, user interface data, or product feature data.

5. The method of claim 1, wherein receiving the request comprises receiving, by the processing device, a user selection of the item from a user interface.

6. The method of claim 1, wherein identifying the first set of values comprises:
  identifying the first set of values from the data satisfying a threshold criterion for each parameter of the first set of parameters without any user interactions.

7. The method of claim 6, wherein the threshold criterion for each parameter of the first set of parameters is configurable.

8. The method of claim 1, wherein generating the modified version of the test plan comprises one or more of:
  adding a first set of test cases to the test plan;
  removing a second set of test cases from the test plan; or
  updating of a third set of test cases in the test plan.

9. The method of claim 1, further comprising:
  providing, by the processing device, one or more configuration files with the modified version of test plan to test the computer product using the one or more configuration files.

10. The method of claim 1, further comprising:
  providing, by the processing device, a computing environment according to one or more of the first set of parameters and the first set of values to test the computer product using the modified version of the test plan.

11. The method of claim 1, further comprising:
  creating a set of automation jobs to execute the modified version of the test plan.

12. The method of claim 11, wherein the set of automation jobs comprises a set of instructions to execute a set of actions without user interaction, the set of actions automating testing steps identified in the test plan.

13. A system comprising:
  a memory; and
  a processing device associated with a quality assurance system, the processing device communicably coupled to the memory to:
    obtain a set of data having a unified data format representing customer specific usage of a computer product external to the quality assurance system;
    receive a request to filter the set of data in view of an item;
    in response to receiving the request, obtain, from the set of data, a set of relevant data relevant to testing the computer product by identifying a first set of parameters relevant to testing the computer product based on a mapping between parameters of the set of data and the item, and a first set of values corresponding to the first set of parameters;
    identify a set of differences between the first set of parameters and the first set of value and a second set of parameters and a second set of values, respectively;
    build a test plan to test the computer product based on the set of differences;
    create a set of automation jobs to execute the test plan;

generate a computing environment according to one or more of the first set of parameters and the first set of values; and provide instructions to execute at least a portion of the test plan using the set of automation jobs in the computing environment.

14. The system of claim 13, wherein the set of automation jobs comprises a set of instructions to execute a set of actions without user interaction, the set of actions automating testing steps identified in the test plan.

15. The system of claim 13, wherein to receive the request, the processing device is to receive a user selection of the item from a user interface.

16. The system of claim 13, wherein to build the test plan, the processing device is to:

add one or more test cases to the test plan, each of the one or more test cases comprising a set of actions to be executed involving the computer product.

17. A non-transitory machine-readable storage medium storing instructions that cause a processing device associated with a quality assurance system to:

obtain a plurality of data records associated with customer specific usage of a computer product external to the quality assurance system, wherein the plurality of data records comprises a first data record having a first data format and a second data record having a second data format different from the first data format;

convert the plurality of data records into a set of data having a unified data format representing the customer specific usage of the computer product;

receive a request to filter the set of data in view of an item;

in response to receiving the request, identify, from the set of data, a set of relevant data relevant to testing the computer product by identifying a first set of parameters relevant to testing the computer product based on a mapping between parameters of the set of data and the item, and a first set of values corresponding to the first set of parameters;

compare the first set of parameters and the first set of values with a second set of parameters and a second set of values associated with a test plan to test the computer product, thereby identifying a set of differences; and generate a modified version of the test plan by modifying the second set of parameters and the second set of values based on the set of differences.

18. The non-transitory machine-readable storage medium of claim 17, wherein to generate the modified version of the test plan, the processing device is to perform one or more of:

addition of a first set of test cases to the test plan;

removal of a second set of test cases from the test plan; or update of a third set of test cases existing in the test plan.

19. The non-transitory machine-readable storage medium of claim 17, wherein the processing device is further to:

provide one or more configuration files with the modified version of test plan to test the computer product using the one or more configuration files;

provide a computing environment according to one or more of the first set of parameters and the first set of values to test the computer product using the modified version of the test plan; and create a set of automation jobs to execute the modified version of the test plan.

20. The non-transitory machine-readable storage medium of claim 19, wherein the set of automation jobs comprises a set of instructions to execute a set of actions without user interaction, the set of actions automating testing steps identified in the test plan.

* * * * *